(12) United States Patent
Imayoshi

(10) Patent No.: US 11,695,882 B2
(45) Date of Patent: Jul. 4, 2023

(54) IMAGE PROCESSOR, IMAGE FORMING APPARATUS, AND METHOD OF CONTROLLING IMAGE PROCESSOR FOR OBTAINING DESTINATION INFORMATION FROM PORTABLE TERMINAL DEVICE AND SENDING IMAGE DATA TO IMAGE FORMING APPARATUS

(71) Applicant: SHARP KABUSHIKI KAISHA, Sakai (JP)

(72) Inventor: Kenichiroh Imayoshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/835,348

(22) Filed: Jun. 8, 2022

(65) Prior Publication Data
US 2022/0407966 A1 Dec. 22, 2022

(30) Foreign Application Priority Data
Jun. 18, 2021 (JP) .................. 2021-101802

(51) Int. Cl.
H04N 1/00 (2006.01)
H04N 1/327 (2006.01)
H04N 1/44 (2006.01)

(52) U.S. Cl.
CPC ..... *H04N 1/00103* (2013.01); *H04N 1/00307* (2013.01); *H04N 1/00413* (2013.01); *H04N 1/00896* (2013.01); *H04N 1/32765* (2013.01); *H04N 1/4433* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2009/0094254 A1* | 4/2009 | Akita | H04N 1/00514 |
| 2017/0171402 A1* | 6/2017 | Yamaguchi | H04N 1/00307 |
| 2022/0321727 A1* | 10/2022 | Nishii | H04N 1/00915 |
| 2022/0385640 A1* | 12/2022 | Sakiyama | H04L 63/0407 |
| 2022/0407980 A1* | 12/2022 | Arifuku | H04N 1/00408 |

FOREIGN PATENT DOCUMENTS

JP 2014-013618 A 1/2014

* cited by examiner

*Primary Examiner* — Henok Shiferaw
(74) *Attorney, Agent, or Firm* — ScienBiziP, P.C.

(57) ABSTRACT

A controller of an image processor, when detecting a portable terminal device's presence, accepts a selecting operation to select whether or not to refer to an address book held by a portable terminal device (step S32), when accepting the request for referring to the address book, establishes a near field communication with the portable terminal device (Step S34), and acquires, from the portable terminal device, the destination information in the address book (Step S35). When acquiring the destination information in the address book, the controller generates a destination list based on the destination information (Step S36), accepts a selecting operation to select a destination of the image data from the destination list (Step S37), and sends the image data to the accepted destination (Step S39).

8 Claims, 8 Drawing Sheets

IMAGE PROCESSOR, IMAGE FORMING APPARATUS, AND METHOD OF CONTROLLING IMAGE PROCESSOR FOR OBTAINING DESTINATION INFORMATION FROM PORTABLE TERMINAL DEVICE AND SENDING IMAGE DATA TO IMAGE FORMING APPARATUS

BACKGROUND OF THE INVENTION

Field of the Invention

The present disclosure relates to an image processor, an image forming apparatus provided with the image processor, and a method of controlling the image processor.

Description of the Background Art

Conventionally, an MFP (multifunction peripheral) provided with a scanner or the like generates image data by reading, for example, a document placed on a document stand. A user executes an operation to have the document read, and also enters a destination of the image data. When the desired destination is already registered on the MFP side, the user can simply find and select the applicable destination on an operation screen; whereas when the desired destination is unregistered, the user must newly input a destination, which takes time to operate for sending and needs carefulness about erroneous sending.

If the user carries a portable terminal device such as a cell phone or a tablet, and the portable terminal device and the MFP are capable of making a near field communication with each other, the two can be set to be ready for communication through a linked operation commonly known as pairing. For the pairing with the portable terminal device, however, an operation key to search for the applicable portable terminal device must be found on the operation screen, and the portable terminal device and the MFP must be set to be ready for the wireless communication by executing, as specified, an operation from the operation key. Therefore, the above operation is time consuming, and the user, if not familiar with the operation, cannot find the operation key necessary for the pairing, making it difficult to end the operation in a short time.

For example, Japanese Unexamined Patent Application Publication No. 2014-13618 discloses an MFP that has a LAN communicator and a Bluetooth (registered trademark) communicator that communicate with a portable terminal device, a determiner that determines the mode of connection with the portable terminal device, and a data processor that, based on the mode of connection, processes data sent to and received from the portable terminal device. The data processor is configured so as to convert, based on reading setting information, image data read by a reader, and to send the image data to the portable terminal device.

The configuration of the MFP described in the Japanese Unexamined Patent Application Publication No. 2014-13618 enhances an operability when the mode of use is simply to send the image data to the portable terminal device. However, if the destination of the image data is not the user's portable terminal device, an operation for inputting the destination is required. Here, in an address book, the portable terminal device usually stores information such as the name, fax number, or e-mail address of a communication partner to whom the image data may be sent. If the destination of the image data is stored in the address book, it is preferable to configure so that the near field communication is established between the portable terminal device and the MFP, and the destination of the image data can be selected from among the destinations registered in the address book of the portable terminal device, thereby simplifying the user's operation for sending the image data.

The present disclosure has been made in view of the above problems; therefore, it is an object of the present disclosure to provide an image processor, an image forming apparatus, and a method of controlling the image processor that, by merely executing a very simple operation, can select a destination referring to an address book of a portable terminal device and can send image data to the desired destination.

SUMMARY OF THE INVENTION

As a solution of the present disclosure for accomplishing the above object, there is assumed an image processor that acquires destination information from a portable terminal device and sends image data, the image processor including: an operation display that displays an operation screen that enables an inputting operation; a communicator wirelessly communicatable with the portable terminal device; a detector that detects the portable terminal device's presence in an effective area of the wireless communication; a communication establisher that establishes the wireless communication with the portable terminal device; a referring acceptor that accepts, on the operation screen, a selecting operation to select whether or not to refer to an address book held by the portable terminal device; an address book acquirer that acquires the destination information in the address book when the referring acceptor accepts the request for referring to the address book; a destination generator that generates a destination list based on the destination information in the address book acquired by the address book acquirer; a destination acceptor that accepts, on the operation screen, a selecting operation to select a destination of the image data from the destination list generated by the destination generator; and a sending processor that, with the destination acceptor accepting the destination, sends the image data to the accepted destination.

More specific configurations of the image processor having the above configuration are raised as follows. That is, it is preferable that, in the image processor, the referring acceptor, with the detector detecting the portable terminal device's presence, starts an operation to accept the selecting operation to select whether or not to refer.

In addition, it may be so configured that, the image processor further includes: an image reader that reads the image data from a document, and a reading operation acceptor that accepts, on the operation screen, an operation to read the image data by the image reader, wherein the referring acceptor, with the reading operation acceptor accepting the operation to read the image data, starts an operation to accept the selecting operation to select whether or not to refer.

In addition, it may be so configured that, the image processor further includes: a user authenticator that determines whether or not a login operation is executed by a user, wherein the referring acceptor, with the user authenticator determining that the login operation is executed by the user, starts an operation to accept the selecting operation to select whether or not to refer.

In addition, it may be so configured that, the image processor further includes: a mode changer that enables a switching between a normal mode that executes an image process and a sleep mode that suppresses a power consumption than in the normal mode, wherein the referring acceptor, with the mode changer executing the switching from the sleep mode to the normal mode, starts an operation to accept the selecting operation to select whether or not to refer.

In addition, it is preferable that, in the image processor, the communication establisher, with the referring acceptor accepting the request for referring to the address book, starts an operation to establish the wireless communication with the portable terminal device.

An image forming apparatus provided with the image processor having the above configuration is also within the scope of the technical concept of the present disclosure. That is, an image forming apparatus according to the present disclosure for accomplishing the above object includes: the image processor; and an image former that forms an image based on the image data processed by the image processor.

In addition, a method of controlling the image processor having the above configuration is also within the scope of the technical concept of the present disclosure. That is, there is provided a method of controlling an image processor that acquires destination information from a portable terminal device and sends image data, the method including: displaying an operation screen that enables an inputting operation; wirelessly communicating with the portable terminal device; detecting the portable terminal device's presence; establishing a wireless communication with the portable terminal device; accepting, on the operation screen, a selecting operation to select whether or not to refer to an address book held by the portable terminal device; acquiring the destination information in the address book when the request for referring to the address book is accepted in the accepting of the selecting operation; generating a destination list based on the destination information in the address book acquired by the acquiring; accepting, on the operation screen, a selecting operation to select a destination of the image data from the destination list generated by the generating; and when the destination is accepted in the accepting of the selecting operation, sending the image data to the accepted destination.

With the above specific matters provided, the user can select the desired destination referring to the address book of the portable terminal device, without the need for inputting individual destination, making it possible to simplify the user's operation for sending the image data.

According to the present disclosure, the selecting of the destination referring to the address book of the portable terminal device can be executed by a very simple operation, making it possible to simplify the operation of sending the image data to the desired destination.

DESCRIPTION OF THE PREFERRED EMBODIMENTS

An image processor, an image forming apparatus provided with the image processor, and a method of controlling the image processor according to embodiments of the present disclosure will be described with reference to the drawings.

In the following description, the component parts common to first to fourth embodiments are indicated by a common reference sign, and redundant description are to be omitted. Each of the embodiments describes an example in which an image processor 10 according to the present disclosure is applied to an MFP 1 (multifunction peripheral 1) as an image forming apparatus.

Figure 1:
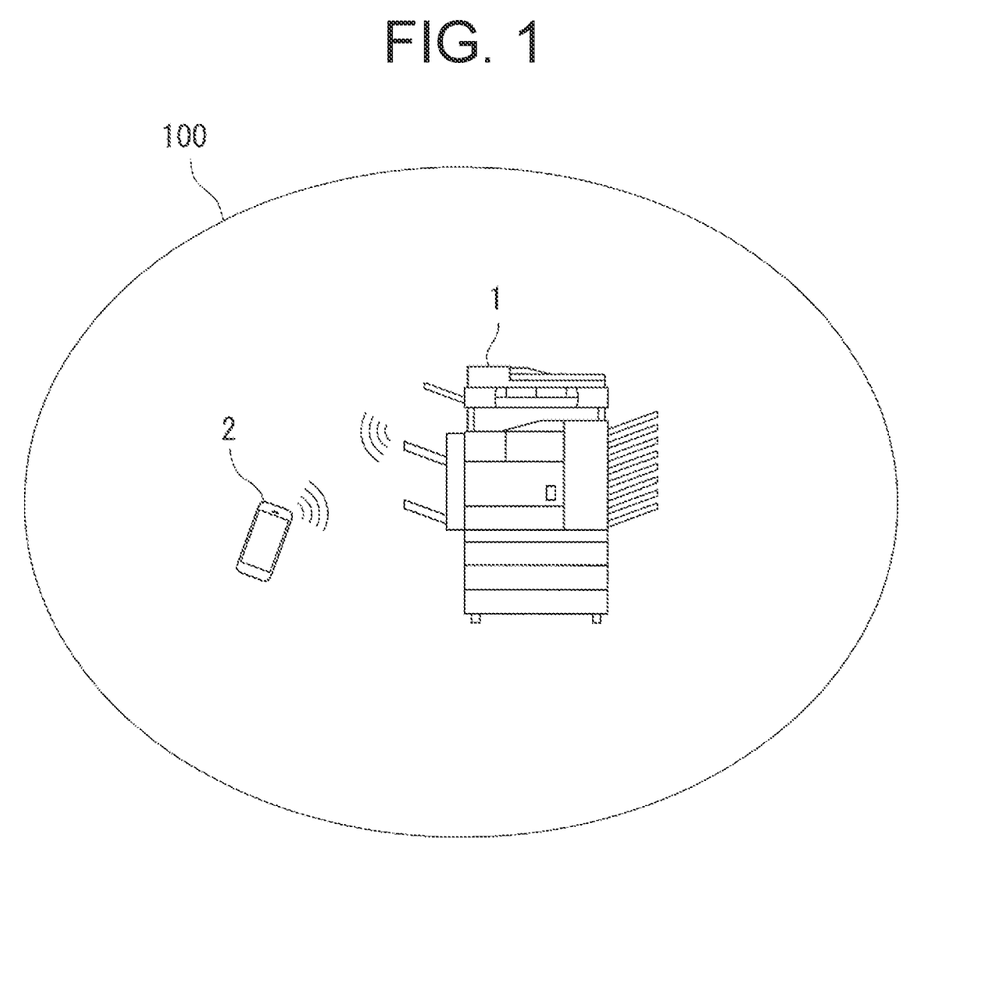
FIG. 1 is a schematic illustration of a configuration including a multifunction peripheral provided with an image processor according to an embodiment of the present disclosure, and a portable terminal device.
Figure 2:
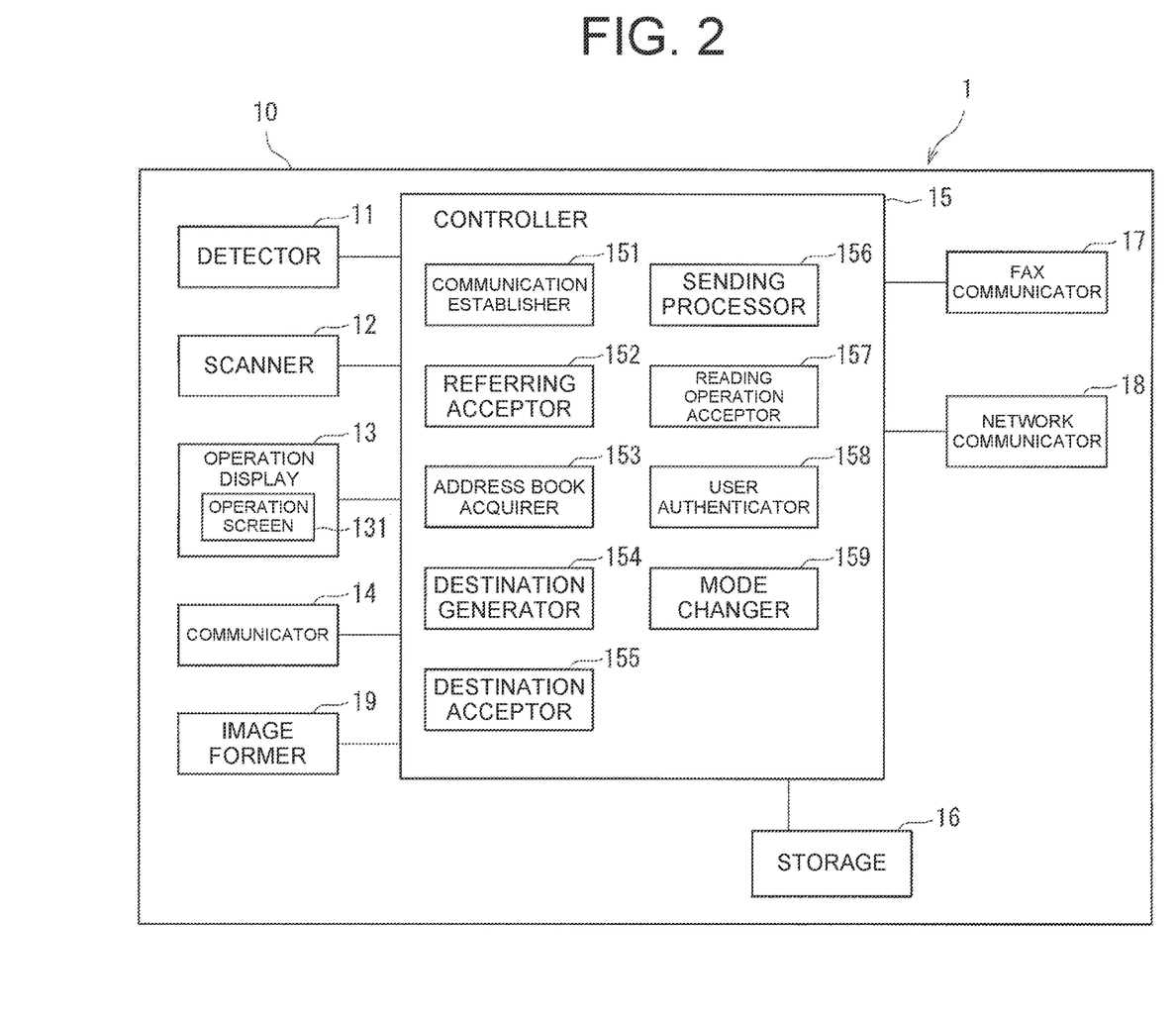
FIG. 2 is a block diagram showing the configuration of the image processor.
Figure 3:
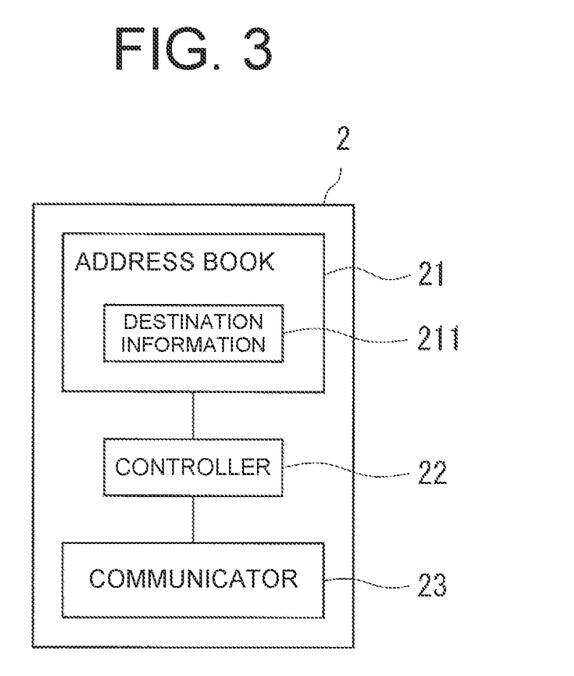
FIG. 3 is a block diagram showing the configuration of the portable terminal device.

FIG. 1 is a schematic illustration of a configuration of the MFP 1 provided with an image processor according to the embodiment of the present disclosure, and a portable terminal device 2, FIG. 2 is a block diagram showing the configurations of the image processor 10 and a method of controlling the same, and FIG. 3 is a block diagram showing the configuration of the portable terminal device 2.

The MFP 1 is a device having various operation modes, such as copy mode, print mode, scan mode, and facsimile mode, and also is referred to as an MFP. As shown in FIG. 1, the MFP 1 is capable of directly making an NFC (Near Field Communication) with the single portable terminal device 2 that is present within an effective area 100 of the NFC. The image processor 10 provided in the MFP 1 is configured so that, through the NFC with the portable terminal device 2, destination information pertaining to a destination of image data is acquired, thus simplifying as much as possible an operation executed by a user holding the portable terminal device 2.

As shown in FIG. 2, the image processor 10 of the MFP 1 has a detector 11 that detects the portable terminal device 2's presence, a scanner 12 as an image reader that inputs, to the image processor 10, the image data generated as a result of reading a document, an operation display 13 that displays an operation screen 131 thereby to notify the user of various information, a communicator 14 that executes the NFC, a controller 15 that overall controls each part of the image processor 10, and a storage 16 that stores various data used in the MFP 1.

Other than the connection with the portable terminal device 2 via the NFC, the image processor 10 may also be connected to a predetermined LAN, or to the external Internet. In the present embodiment, there are provided a FAX communicator 17 for making a communication using, for example, a telephone network, and a network communicator 18 for making a communication via a network with an external device.

The detector 11 detects the portable terminal device 2 that approaches the MFP 1 and is present in the effective area 100. The communicator 14 realizes the NFC with the detected portable terminal device 2. By means of the communicator 14, the controller 15 is capable of sending and receiving various data to and from the portable terminal device 2 via the NFC.

For example, the communicator 14 is configured so as to be communicatable with the single portable terminal device 2 in an ad hoc mode or the like, but not simultaneously communicatable with a plurality of portable terminal devices 2. The communicator 14 may also have a function of an access point, i.e., a parent machine function in a wireless LAN, and may be configured so that a communication is realized by connecting, to an interface (not shown) such as USB, a wireless communication device having an access point function. Methods and standards of the NFC executed by the communicator 14 are not particularly limited, and the NFC can be realized by Bluetooth (registered trademark), for example.

The scanner 12 is provided with a scanner unit. The scanner unit is a reader for optically reading the document placed on the document stand or document tray, and, inside the main body of the MFP 1, includes an optical unit and a control unit that controls a reading operation by the optical unit. To a predetermined image memory, the scanner 12 outputs image data acquired by reading the document. The controller 15 is capable of acquiring the image data from the image memory.

The operation display 13 displays an operation screen 131 that enables an inputting operation by using a touch screen and an LCD (Liquid Crystal Display). The operation display 13 may include the operation screen 131 and a plurality of physical buttons (not shown).

The storage 16 includes an HDD (Hard Disk Drive) or an SSD (Solid State Drive). The storage 16 stores address information for various communication functions, such as fax and e-mail communication functions. The storage 16 also stores the image data read by the scanner 12 and the image data received via the communicator 14.

The MFP 1 is further provided with an image former 19. The image former 19 is provided with a printer unit and is placed inside the main body of the MFP 1. The image former 19 generates a toner image based on the image data and transfers the toner image onto a recording medium such as paper, thereby to form the image.

The portable terminal device 2 is a so-called smartphone. The portable terminal device 2 may be a cellular phone, tablet, or portable computer, and is capable of making the NFC with the image processor 10.

As shown in FIG. 3, the portable terminal device 2 has an address book 21 as a storage in which predetermined destination information 211 is stored. The address book 21 stores the destination information 211 that maps the name of a communication partner, who can be the destination of the image data, with the destination such as a fax number or e-mail address.

The portable terminal device 2 also has a controller 22 and a communicator 23. The controller 22 uses a CPU thereby to control each component based on a control program stored in a built-in ROM. The communicator 23 executes a wireless communication function including the NFC. Communicating with the communicator 14 of the image processor 10 based on an instruction from the controller 22, the communicator 23 can send and receive, to and from the image processor 10, the destination information 211 of the address book 21, and various data.

In the image processor 10 capable of making the NFC with the portable terminal device 2, the controller 15 uses the CPU thereby to control each of component parts such as a communication establisher 151, a referring acceptor 152, an address book acquirer 153, a destination generator 154, a destination acceptor 155, and a sending processor 156 which are shown in FIG. 2, based on the control program stored in the built-in ROM or the like.

The communication establisher 151 establishes the NFC with the portable terminal device 2 whose presence has been detected in the detector 11. On the operation screen 131, the referring acceptor 152 accepts a selecting operation to select whether or not to refer to the address book 21 held by the portable terminal device 2. With the referring acceptor 152 accepting a request for referring to the address book 21, the address book acquirer 153 acquires the destination information 211 of the address book 21.

The destination generator 154 generates a destination list based on the address book 21's destination information 211 acquired by the address book acquirer 153. From the destination list generated by the destination generator 154, the destination acceptor 155 accepts, at the operation screen 131, a selecting operation to select the destination. With the destination acceptor 155 accepting the destination of the image data, the sending processor 156 sends the image data to the accepted destination.

In addition, the controller 15 may include a reading operation acceptor 157, a user authenticator 158, and a mode changer 159. On the operation screen 131, the reading operation acceptor 157 accepts the operation to read the image data by the scanner 12. The user authenticator 158 determines whether or not a login operation has been executed by an authorized user. The mode changer 159 is configured so as to switch a normal mode at the time of executing the image process at the image processor 10 and a sleep mode as an operation mode that suppresses a power consumption than in the above normal mode.

Referring, through the NFC, to the address book 21 held by the portable terminal device 2, the image processor 10 configured in this way can send the image data to the user-desired destination from the portable terminal device 2 having established the NFC. The image processor 10 can be configured so as to include a plurality of modes of timing for referring to the address book 21 of the portable terminal device 2, for example, to refer to the address book 21 at the four timings shown in the first to fourth embodiments.

First Embodiment

Figure 4:
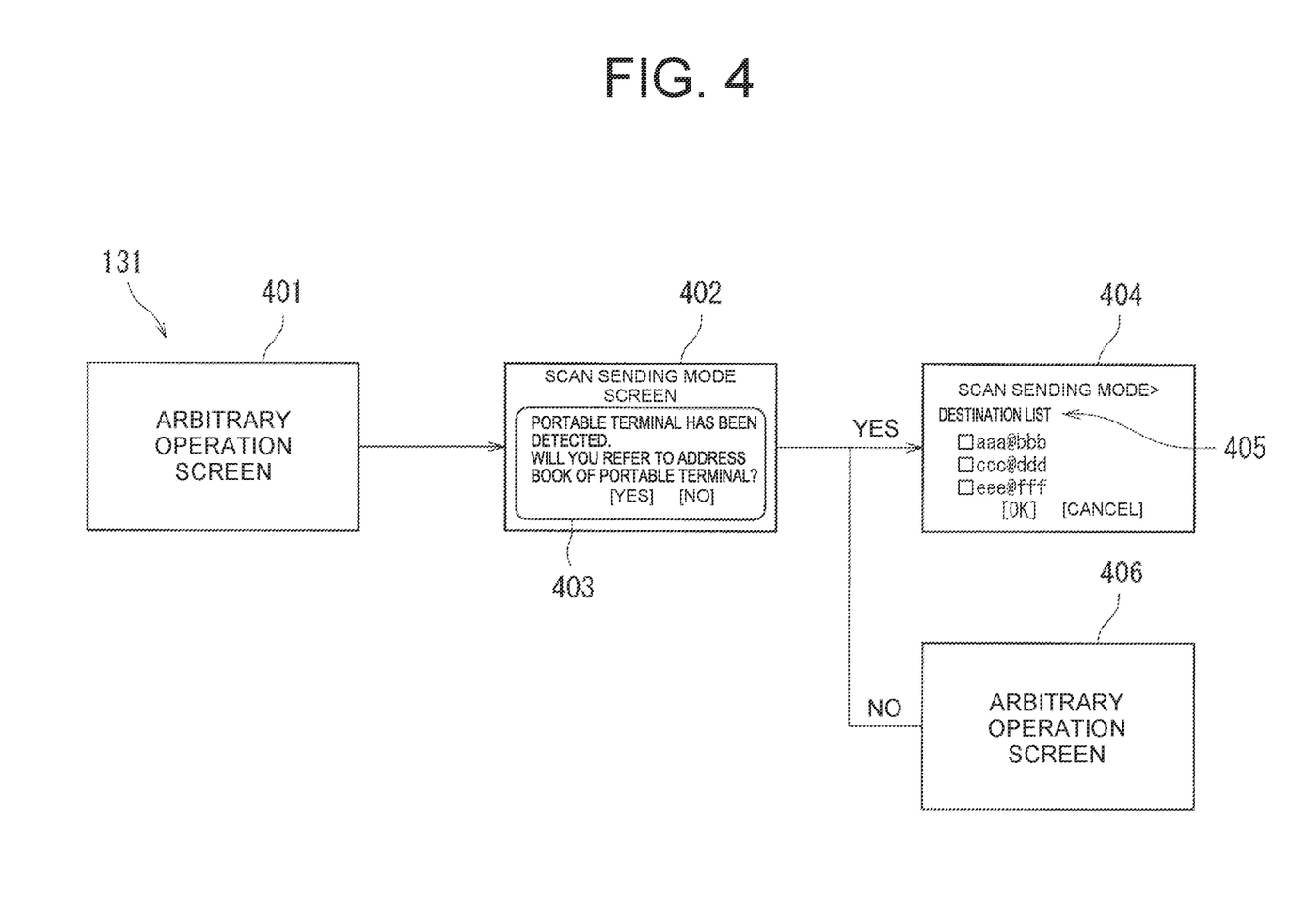
FIG. 4 shows an example of the transition of an operation screen displayed on an operation display in the image processor according to a first embodiment.

FIG. 4 shows an example of the transition of the operation screen 131 displayed on the operation display 13 in the image processor 10 according to a first embodiment. The image processor 10 according to the first embodiment is configured so that the referring acceptor 152, with the detector 11 detecting the portable terminal device 2's presence, starts an operation to accept the selecting operation to select whether or not to refer to the address book 21.

That is, for example, when the user holding the portable terminal device 2 approaches the MFP 1, the detector 11 detects the portable terminal device 2's presence in the effective area 100. As shown in FIG. 4, the operation screen 131 displays an arbitrary operation screen 401, and with the portable terminal device 2's presence detected, transitions to an operation screen 402. The operation screen 402, with a dialog box, displays a selection screen 403 to inquire whether or not to refer to the address book 21 held by the portable terminal device 2. The dialog box displays an inquiry such as "Portable terminal has been detected. Do you refer to address book of portable terminal?".

In addition, the selection screen 403 to select whether or not to refer to the address book selectably display "Yes" for referring to the address book 21 and "No" for not referring to the address book 21. The selection screen 403 to select whether or not to refer to the address book can be displayed, for example, on the operation screen 402 in the scan sending mode that accepts the operation to read the image data by the scanner 12.

Operating "Yes" at the selection screen 403 to select whether or not to refer to the address book is determined that referring to the address book 21 has been requested, and the operation screen 131 transitions to an operation screen 404. Based on the destination information 211 in the portable terminal device 2's address book 21 acquired by the address book acquirer 153, the image processor 10 generates a destination list 405. The operation screen 404 displays the destination list 405 and accepts the selecting operation to select the destination of the image data.

The destination list 405 displays selectable destinations, for example, a plurality of e-mail addresses and names of communication partners. The user, on the operation screen 404, selects the destination of the image data from the destinations shown in the destination list 405, and enters "OK", thereby making it possible to select the destination of the image data. The image processor 10 accepts the destination of the image data, and sends the image data to the accepted destination.

In the operation screen 402; operating "No" on the selection screen 403 to select whether or not to refer to the address book is determined that referring to the address book 21 is not requested, and the operation screen 131 transitions to, for example, an arbitrary operation screen 406 such as a destination list that has already been registered. In the operation screen 404; entering "Cancel" without selecting the destination from the destination list 405 is determined that referring to the address book 21 is not requested, and the operation screen 131 transitions to the arbitrary operation screen 406.

Figure 5:
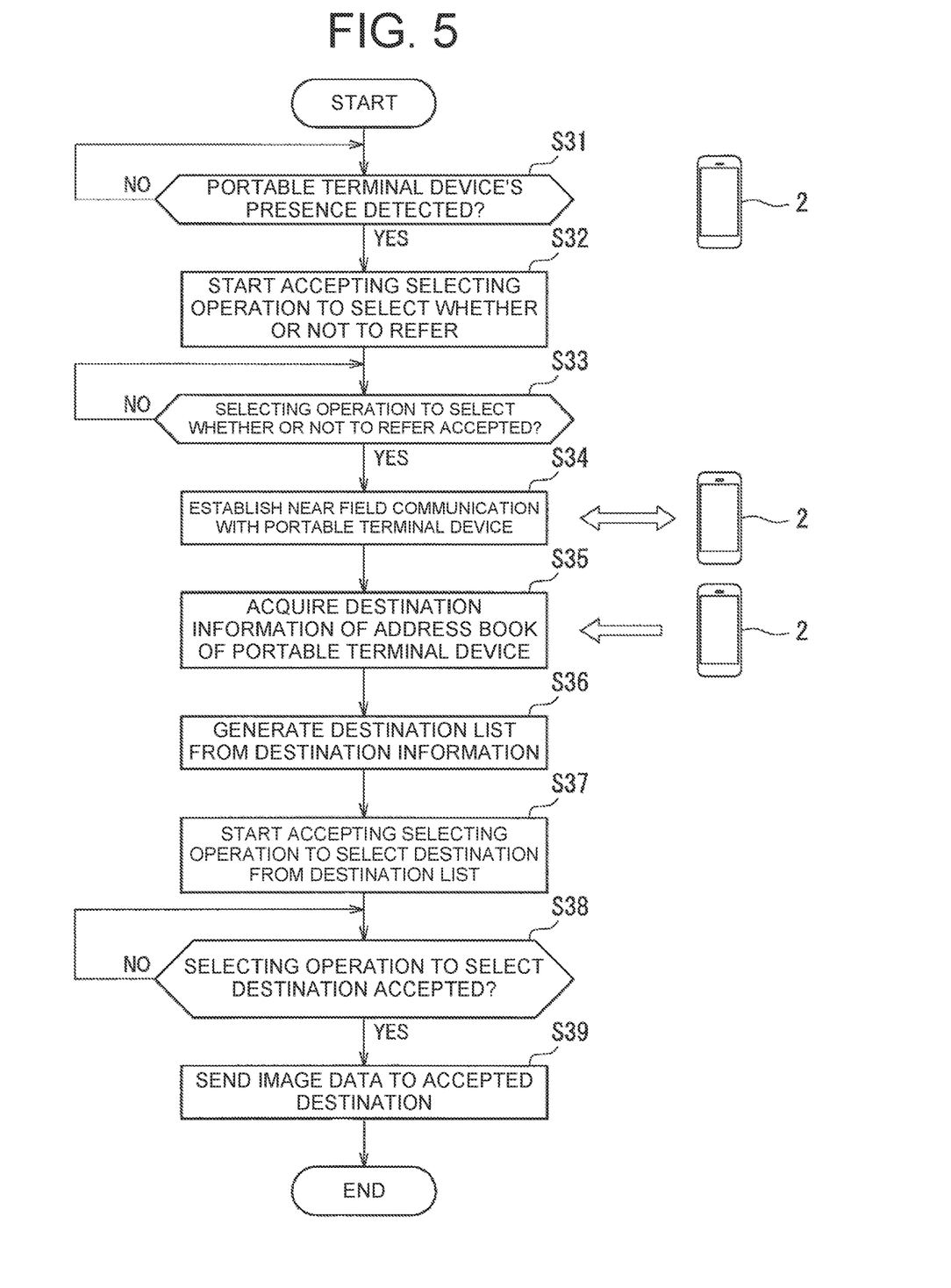
FIG. 5 is a flowchart showing an example of processes executed in the image processor.

FIG. 5 is a flowchart showing an example of processes executed in the image processor 10.

Referring to FIG. 2 and FIG. 5, a method of controlling the image processor 10 will be described. The controller 15 determines whether or not the detector 11 has detected the portable terminal device 2's presence in the effective area 100 (step S31). When determining that the portable terminal device 2's presence is not detected (NO in step S31), the controller 15 returns the process to step S31, and waits until determining that the portable terminal device 2's presence is detected.

With the detector 11 detecting the portable terminal device 2's presence (YES in step S31), the referring acceptor 152 starts the operation to accept the selecting operation to select whether or not to refer to the address book 21 held by the portable terminal device 2 (step S32). The operation screen 131 (operation screen 402 shown in FIG. 4) displays the selection screen 403 to select whether or not to refer to the address book, and accepts the selecting operation from the user.

With "No" selected on the selection screen 403, it is determined that referring to the address book 21 is not requested (NO in step S33), and the process returns to step S33. Alternatively, it is possible that the operation display 13 displays the operation screen 402 of the scan sending mode, and the operation screen 131 transitions to the arbitrary operation screen 406.

With "Yes" selected on the selection screen 403, it is determined that referring to the address book 21 is requested (YES in step S33), and the request for referring to the address book 21 is accepted. Here, with the referring acceptor 152 accepting the request for referring to the address book 21, the communication establisher 151 starts an operation to establish the NFC with the portable terminal device 2 (step S34). The image processor 10 and the portable terminal device 2 establish the NFC.

With the request for referring to the address book 21 accepted, the address book acquirer 153, through the communicator 14, acquires the destination information 211 of the address book 21 of the portable terminal device 2 (step S35). Accepting, from the image processor 10, the request for referring to the address book 21, the portable terminal device 2 reads out the destination information 211 and sends the destination information 211 of the address book 21, through the communicator 23 to the image processor 10.

Based on the acquired destination information 211 of the address book 21, the destination generator 154 generates the destination list 405 of the image data (step S36). Then, the destination acceptor 155 displays the destination list 405 on the operation screen 131 (operation screen 404 shown in FIG. 4), and, from the user, accepts the selecting operation to select the destination of image data (step S37).

When a desired destination is selected from the destination list 405 and "OK" is input, it is determined that the destination selecting operation has been accepted (step YES in S38), and the sending processor 156 sends the image data based on the destination information 211 that corresponds to the selected destination. When it is determined that the destination selecting operation has not been accepted (NO in step S38), the process is returned to step S38 and waits until the selecting operation is accepted. With "Cancel" input on the operation screen 404, it is determined that accepting of the destination selecting operation is not requested, and the arbitrary operation screen 406 transitions to the scan sending mode or the copy mode thereby to accept the inputting operation.

With this, the user, when sending the image data, can select whether or not to refer to the address book 21 of the portable terminal device 2, by simply standing in front of the MFP 1 holding the portable terminal device 2 (i.e., by simply approaching the MFP 1), and without inputting individual destination on the operation display 13, can end the operation of selecting the desired destination registered in the address book 21 and then sending the image data, making it possible to greatly simplify the operation.

Second Embodiment

Figure 6:
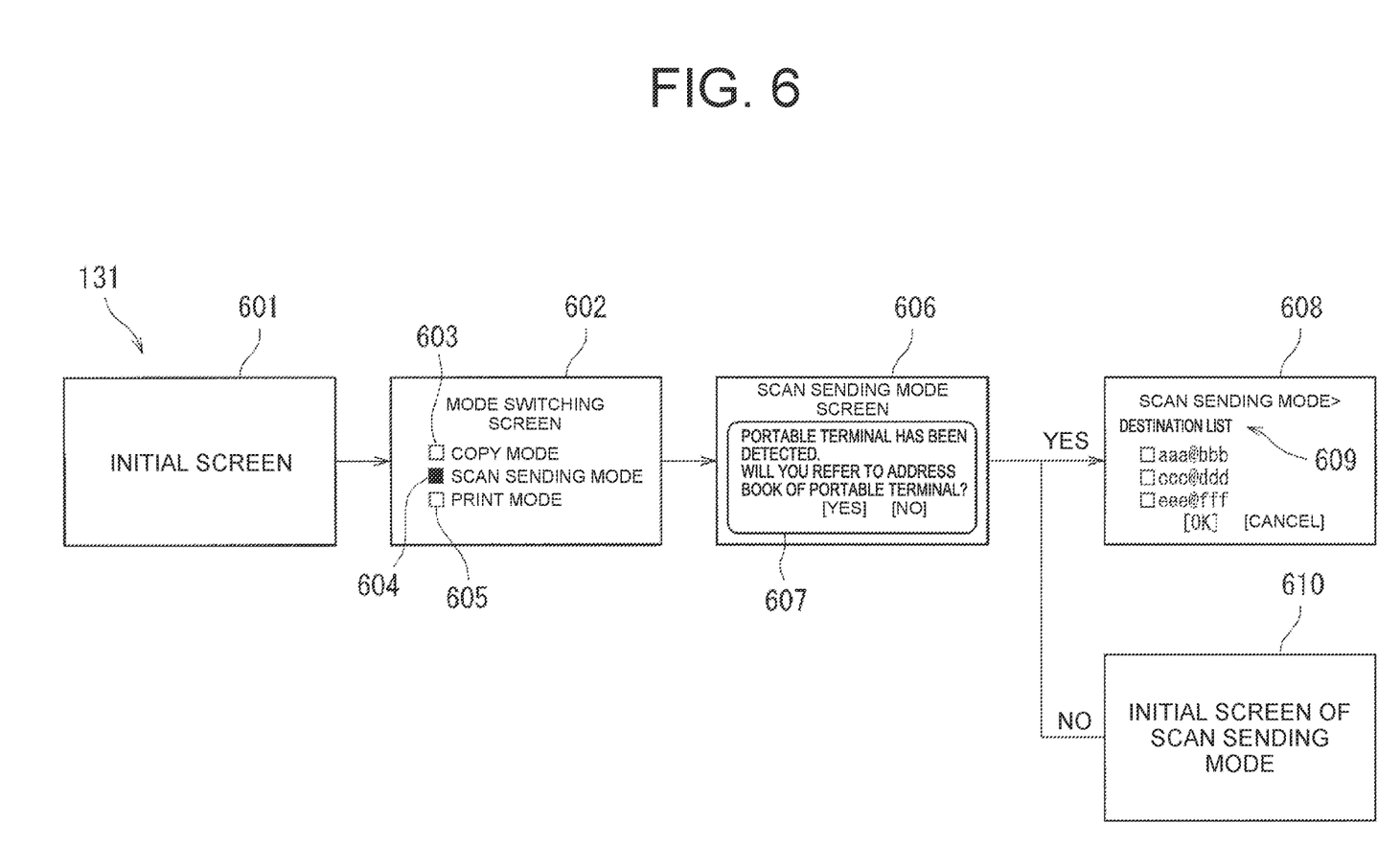
FIG. 6 shows an example of the transition of the operation screen displayed on the operation display in the image processor according to a second embodiment.

FIG. 6 shows an example of the transition of the operation screen 131 displayed on the operation display 13 in the image processor 10 according to a second embodiment. The image processor 10 according to the second embodiment is configured so that, when the user has executed the inputting operation to select the operation to read the image data, the operation to accept the selecting operation to select whether or not to refer to the address book 21 of the portable terminal device 2 held by the user is started.

That is, it is assumed that, when the user holding the portable terminal device 2 stands in front of the MFP 1, the operation screen 131 displays an initial screen 601 such as an operation screen of, for example, the copy mode. So as to execute the reading image data operation by the scanner 12, the user displays a mode switching screen 602 from the initial screen 601. The mode switching screen 602 selectably displays, for example, a copy mode 603, a scan sending mode 604, and a print mode 605. When the user selects the scan sending mode 604 from among the above modes, the reading operation acceptor 157 starts accepting the operation to read the image data by the scanner 12.

Referring to FIG. 2 and FIG. 6; when the reading operation acceptor 157 accepts the operation to read the image data, the operation screen 131 transitions to an operation screen 606 of the scan sending mode. At this point, if the detector 11 has detected the portable terminal device 2's presence in the effective area 100, the operation screen 606, with a dialog box, further displays a selection screen 607 inquiring whether or not to refer to the address book 21 held by the portable terminal device 2. The selection screen 607 selectably shows "Yes" for referring to the address book 21 and "No" for not referring to the address book 21, and then operating "Yes" causes the operation screen 131 to transition to an operation screen 608.

In the image processor 10; the referring acceptor 152 accepts the request for referring to the address book 21, and the address book acquirer 153 acquires the destination information 211 of the address book 21. The destination generator 154 generates a destination list 609 based on the acquired destination information 211. The operation screen 608 displays the destination list 609, and accepts the selecting operation to select the destination of the image data. The destination list 609 selectably displays destinations such as a plurality of e-mail addresses, making it possible for the user to select the desired destination.

After selecting the destination of the image data, with the operation screen 131 transitioned to a scan sending mode screen (not shown), the user can input a condition for reading the document to be read by the scanner 12 (document type, resolution, reading size, color/monochrome, or the like). The image processor 10 accepts the destination of the image data, executes the reading operation with the scanner 12, and sends the image data to the accepted destination.

When "No" is operated on the operation screen 606, it is determined that referring to the address book 21 is not requested, and the operation screen 131 transitions to an arbitrary operation screen 610, such as the initial screen of the scan sending mode, for example.

In addition, it may be configured so that, for example, a condition for reading the document to be read with the scanner 12 is input on the operation screen 610, the reading operation acceptor 157 accepts the reading operation of the image data, and then the dialog box displays the selection screen 607 inquiring whether or not to refer to the address book 21 held by the portable terminal device 2.

This allows the user to achieve that, when sending the image data, merely selecting the scan sending mode 604 while holding the portable terminal device 2 can further select whether or not to refer to the address book 21 of the portable terminal device 2. The user, without inputting individual destination, can end the operation of selecting the desired destination registered in the address book 21 and then sending the image data, making it possible to greatly simplify the operation.

Third Embodiment

Figure 7:
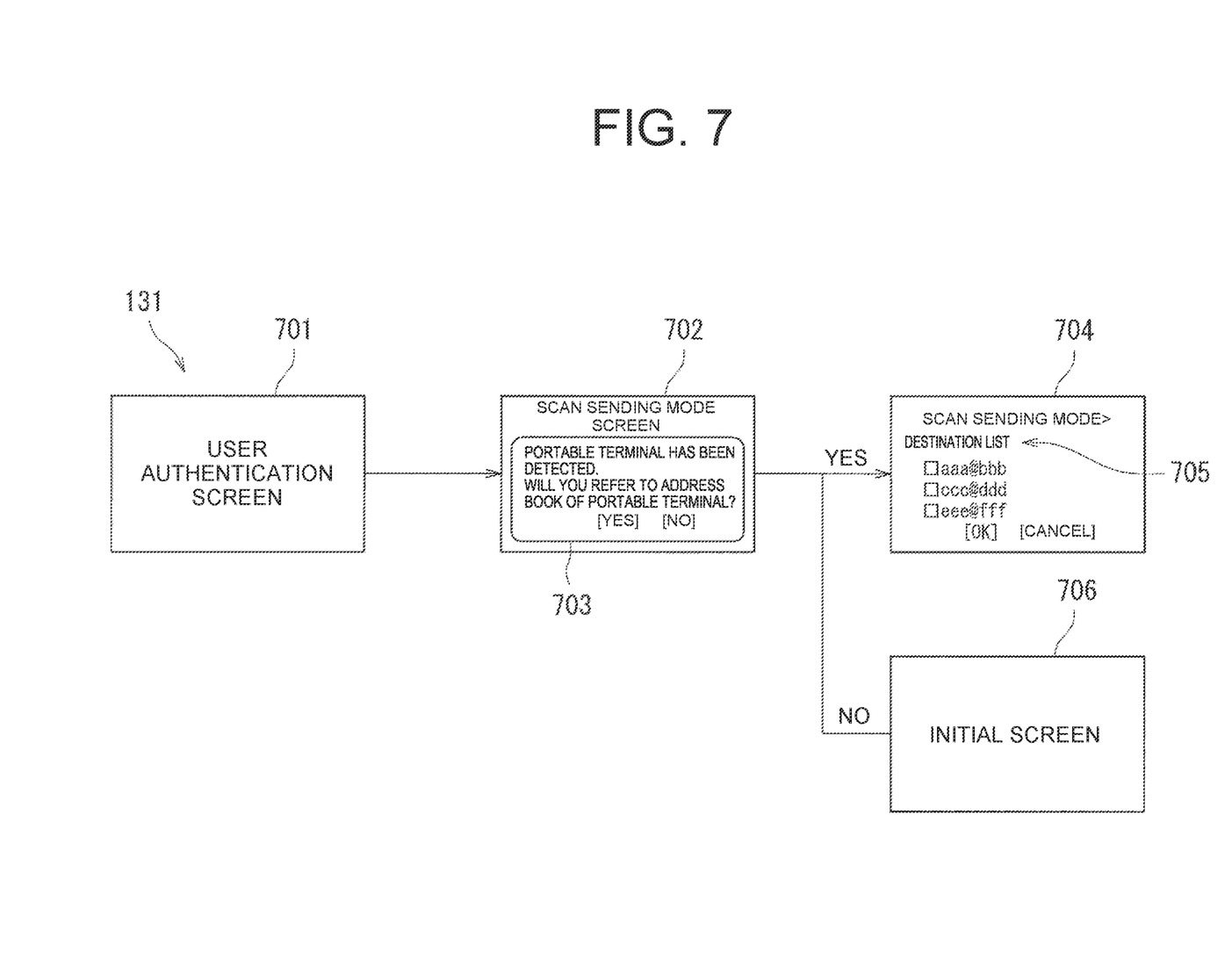
FIG. 7 shows an example of the transition of the operation screen displayed on the operation display in the image processor according to a third embodiment.

FIG. 7 shows an example of the transition of the operation screen 131 displayed on the operation display 13 in the image processor 10 according to a third embodiment. The image processor 10 according to the third embodiment is configured so that, the user authenticator 158, when determining that the authorized user has executed a login operation, starts the operation to accept the selecting operation to select whether or not to refer to the address book 21 of the portable terminal device 2 held by the user.

Referring to FIG. 2 and FIG. 7; the user authenticator 158 determines whether or not the login operation has been executed by a local user, and executes the authenticating process on the user. As shown in FIG. 7, the operation screen 131 displays a user authentication screen 701. The user authenticator 158 accepts user authentication information such as user ID and password input at the user authentication screen 701, and executes the authenticating process. When it is determined that the login operation has been executed by the authorized user, the login is permitted.

With the user authenticator 158 determining that the login operation has been executed by the authorized user, the referring acceptor 152 starts accepting the selecting operation to select whether or not to refer to the address book 21. That is, the operation screen 131 transitions from the user authentication screen 701 to a scan sending mode operation screen 702; at this point, if the detector 11 has detected the portable terminal device 2's presence in the effective area 100, the operation screen 702, with a dialog box, displays a selection screen 703 inquiring whether or not to refer to the address book 21 held by the portable terminal device 2.

On the selection screen 703, operating "Yes" for referring to the address book 21 causes the operation screen 131 to transition to an operation screen 704. The referring acceptor 152 accepts the request for referring to the address book 21, and the address book acquirer 153 acquires the destination information 211 of the address book 21. The destination generator 154 generates a destination list 705 from the acquired destination information 211. The operation screen 704 displays the destination list 705, and an operation to select the destination of the image data is accepted. The user can select the desired destination from the destination list 705.

In addition, the operation screens after the login (702, 704, 706 and the like) selectably displays "Logout" (not shown); when the user inputs "Logout", the user authenticator 158 executes a logout process, cancelling the login state.

It is preferable to configure so that the user authentication information including the user ID and password input by the user on the user authentication screen 701 is searched from a user information storage area, and that when the user authentication information could be searched, it is determined that the login operation was executed by the authorized user and the login is permitted. Meanwhile, when the above user authentication information could not be found, an error may be displayed as user authentication could not be executed.

The operation of accepting the selecting operation to select whether or not to refer to the address book 21 may be started not only when it is determined that the login operation is executed by the user, but also when the user is detected, for example, by a human sensor installed in the MFP 1.

In the image processor 10 configured in this way as well, the user, without inputting individual destination, can select whether or not to refer to the address book 21 of the portable terminal device 2, and can end the operation of selecting the desired destination and then sending the image data, making it possible to greatly simplify the operation.

Fourth Embodiment

Figure 8:
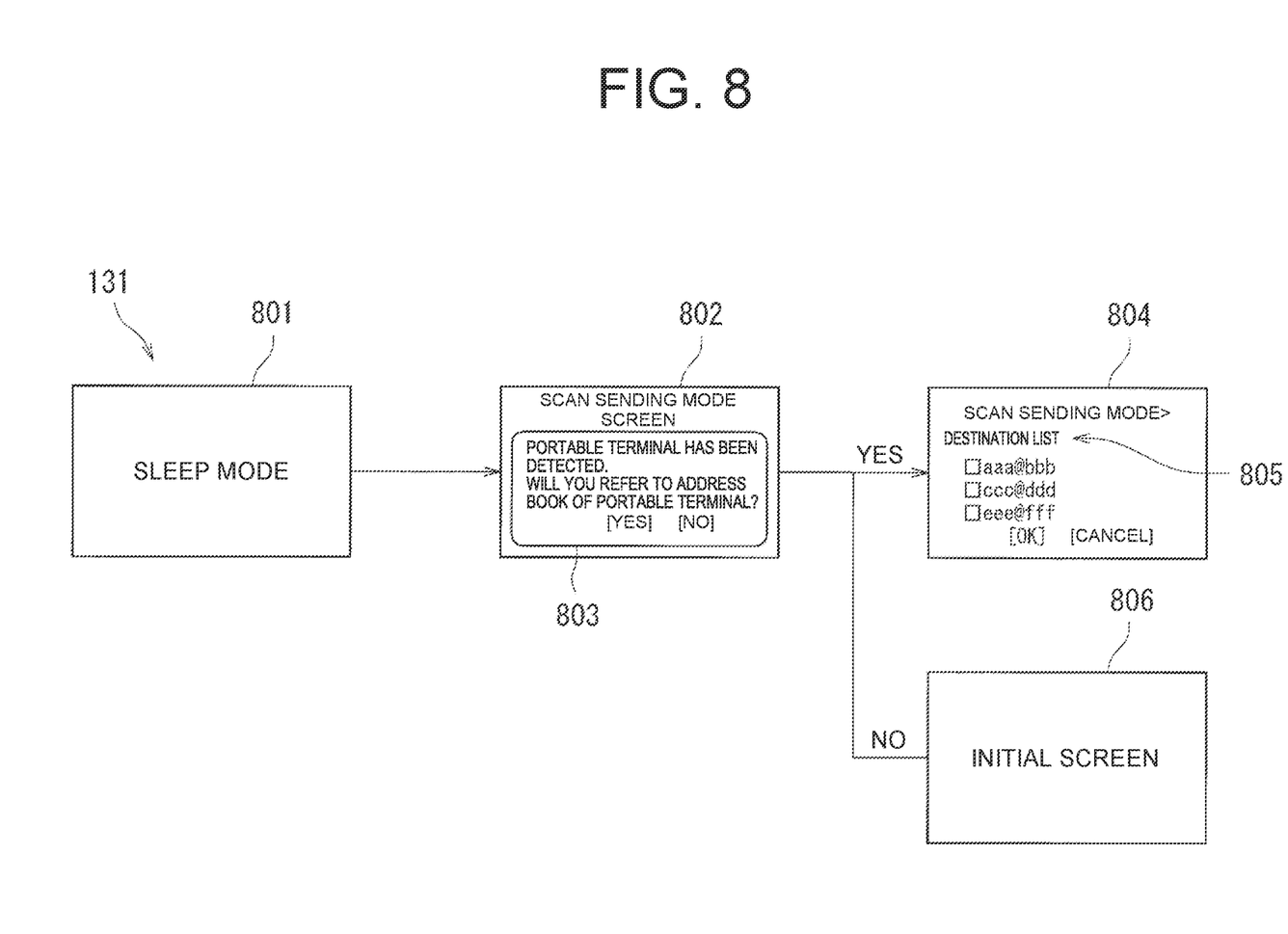
FIG. 8 shows an example of the transition of the operation screen displayed on the operation display in the image processor according to a fourth embodiment.

FIG. 8 shows an example of the transition of the operation screen 131 displayed on the operation display 13 in the image processor 10 according to a fourth embodiment. The image processor 10 according to the fourth embodiment is configured so as to, with the sleep mode switched to the normal operation mode, start the operation to accept the selecting operation to select whether or not to refer to the address book 21 of the portable terminal device 2.

Depending on a usage condition, the MFP 1 can shift from the normal mode, which is an operation mode in a normal standby state (ready to immediately execute the input function such as copy mode), to an energy-saving sleep mode, which operates with less power consumption than in the normal mode.

The normal mode is a mode in which all functions provided in the MFP 1 can be used, and standby is executed with no job being executed. The sleep mode is a mode in which the MFP 1 suppresses the power supply to a predetermined functional portion, and is also referred to as a so-called energy-saving mode. In the sleep mode, for example, the user may be able to use only a part of functions of the MFP 1 (e.g., receiving of faxes), or even if a print job is executed, dropping of a fixer temperature takes time for starting the printing.

The mode changer 159 executes a switching between the sleep mode and the normal mode. For example, it can be configured so that, when the portable terminal device 2 approaches the MFP 1 in the sleep mode, the mode changer 159 returns the mode from the sleep mode to the normal mode. In addition, it may be configured so that the mode changer 159 executes the switching between the normal mode and the sleep mode based on a schedule set by an administrator or the like of the MFP 1.

Referring to FIG. 2 and FIG. 8; the operation display 13 displays, as the operation screen 131, a sleep mode operation screen 801, and the mode changer 159, when executing the switching from the sleep mode to the normal mode, causes the operation screen 131 to transition to an operation screen 802. For example, when it is configured so that the portable terminal device 2 approaching the MFP 1 returns the mode from the sleep mode to the normal operation mode, the detector 11 detects the portable terminal device 2's presence in the effective area 100, thereby causing a dialog box of the operation screen 802 to display a selection screen 803 inquiring whether or not to refer to the address book 21 held by the portable terminal device 2.

In the selection screen 803 to select whether or not to refer to the address book, operating "Yes" for referring to the address book 21 causes the operation screen 131 to transition to an operation screen 804. The referring acceptor 152 accepts the request for referring to the address book 21, and the address book acquirer 153 acquires the destination information 211 of the address book 21. The destination generator 154 generates a destination list 805 from the acquired destination information 211, the destination list 805 is displayed on the operation screen 804, and an operation to select the destination of the image data is accepted. The user can select the desired destination from the destination list 805.

Operating "No" on the selection screen 803 to select whether or not to refer to the address book is determined that referring to the address book 21 is not requested, and the operation screen 131 transitions to an initial screen 806 of the scan sending mode or the like, for example.

In the image processor 10 configured in this way as well, the user, without inputting individual destination on the operation screen 131, can select whether or not to refer to the address book 21 of the portable terminal device 2, and can end the operation of selecting the desired destination and then sending the image data, making it possible to greatly simplify the operation. Even the user unfamiliar with the operation of the MFP 1 can easily establish the NFC with the portable terminal device 2 and can select the request for referring to the address book 21, making it possible to end the operation efficiently in a short time.

In each of the above embodiments, the present disclosure is described as the image processor 10 in the MFP 1, but the present disclosure can be embodied as an image processor not provided with the image former 19.

The present disclosure is not limited to the embodiments described above, but can be executed in various other forms. Therefore, the above embodiments are in all respects merely illustrative and should not be construed as limiting. The scope of the present disclosure is indicated by the claims, and is not bound in any way by the text of the specification. Further, all variations and modifications that fall within the equivalent scope of the claims are within the scope of the present disclosure.

What is claimed is:

1. An image processor that acquires destination information from a portable terminal device and sends image data, the image processor comprising:
    an operation display that displays an operation screen that enables an inputting operation;
    a communicator wirelessly communicatable with the portable terminal device;
    a detector that detects the portable terminal device's presence in an effective area of the wireless communication;
    a communication establisher that establishes the wireless communication with the portable terminal device;
    a referring acceptor that accepts, on the operation screen, a selecting operation to select whether or not to refer to an address book held by the portable terminal device;
    an address book acquirer that acquires the destination information in the address book when the referring acceptor accepts the request for referring to the address book;
    a destination generator that generates a destination list based on the destination information in the address book acquired by the address book acquirer;
    a destination acceptor that accepts, on the operation screen, a selecting operation to select a destination of the image data from the destination list generated by the destination generator; and
    a sending processor that, with the destination acceptor accepting the destination, sends the image data to the accepted destination.

2. The image processor according to claim 1, wherein the referring acceptor, with the detector detecting the portable terminal device's presence, starts an operation to accept the selecting operation to select whether or not to refer.

3. The image processor according to claim 1, further comprising:
    an image reader that reads the image data from a document, and
    a reading operation acceptor that accepts, on the operation screen, an operation to read the image data by the image reader,
wherein the referring acceptor, with the reading operation acceptor accepting the operation to read the image data, starts an operation to accept the selecting operation to select whether or not to refer.

4. The image processor according to claim 1, further comprising:
  a user authenticator that determines whether or not a login operation is executed by a user,
wherein the referring acceptor, with the user authenticator determining that the login operation is executed by the user, starts an operation to accept the selecting operation to select whether or not to refer.

5. The image processor according to claim 1, further comprising:
  a mode changer that enables a switching between a normal mode that executes an image process and a sleep mode that suppresses a power consumption than in the normal mode,
wherein the referring acceptor, with the mode changer executing the switching from the sleep mode to the normal mode, starts an operation to accept the selecting operation to select whether or not to refer.

6. The image processor according to claim 1, wherein the communication establisher, with the referring acceptor accepting the request for referring to the address book, starts an operation to establish the wireless communication with the portable terminal device.

7. An image forming apparatus comprising:
  the image processor according to claim 1; and
  an image former that forms an image based on the image data processed by the image processor.

8. A method of controlling an image processor that acquires destination information from a portable terminal device and sends image data, the method comprising:
  displaying an operation screen that enables an inputting operation;
  wirelessly communicating with the portable terminal device;
  detecting the portable terminal device's presence;
  establishing a wireless communication with the portable terminal device;
  accepting, on the operation screen, a selecting operation to select whether or not to refer to an address book held by the portable terminal device;
  acquiring the destination information in the address book when the request for referring to the address book is accepted in the accepting of the selecting operation;
  generating a destination list based on the destination information in the address book acquired by the acquiring;
  accepting, on the operation screen, a selecting operation to select a destination of the image data from the destination list generated by the generating; and
  when the destination is accepted in the accepting of the selecting operation, sending the image data to the accepted destination.

* * * * *